US008317957B2

(12) United States Patent
Schivley

(10) Patent No.: US 8,317,957 B2
(45) Date of Patent: Nov. 27, 2012

(54) ADHESIVE MASKING ARTICLE FOR CORNERS AND DOOR HINGES

(75) Inventor: Russel J. Schivley, Bluffton, SC (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/037,940

(22) Filed: Mar. 1, 2011

(65) Prior Publication Data

US 2011/0146882 A1 Jun. 23, 2011

Related U.S. Application Data

(62) Division of application No. 11/614,192, filed on Dec. 21, 2006, now Pat. No. 7,922,844.

(51) Int. Cl.
*B32B 38/10* (2006.01)
*B32B 37/02* (2006.01)

(52) U.S. Cl. .......................................... 156/71; 156/249

(58) Field of Classification Search ..................... 156/71
See application file for complete search history.

(56) References Cited

U.S. PATENT DOCUMENTS

| | | | | |
|---|---|---|---|---|
| 3,752,304 | A * | 8/1973 | Alef | 428/43 |
| 3,961,602 | A | 6/1976 | Dresser | |
| 4,796,330 | A | 1/1989 | Ziegler | |
| 5,056,191 | A * | 10/1991 | Love | 16/251 |
| 5,073,457 | A * | 12/1991 | Blackwell | 428/484.1 |
| 5,198,031 | A | 3/1993 | Derstine | |
| 5,631,055 | A * | 5/1997 | Vines et al. | 428/40.1 |
| 5,722,120 | A | 3/1998 | Bindschatel | |
| 6,579,587 | B2 | 6/2003 | Schnoebelen, Jr. | |
| 2002/0004103 | A1 | 1/2002 | Lynch | |
| 2002/0004133 | A1 | 1/2002 | Nakib | |
| 2003/0035915 | A1 | 2/2003 | Schnoebelen, Jr. | |
| 2004/0028867 | A1 | 2/2004 | Allison | |
| 2004/0086679 | A1 | 5/2004 | Ganci | |
| 2005/0252157 | A1 * | 11/2005 | Behymer | 52/716.1 |
| 2007/0172618 | A1 | 7/2007 | Schivley | |

FOREIGN PATENT DOCUMENTS

| | | | |
|---|---|---|---|
| DE | 19907991 | A1 * | 8/2000 |
| WO | 92/16367 | | 10/1992 |
| WO | 2006/109093 | A1 | 10/2006 |

OTHER PUBLICATIONS

Supplementary European Search Report, PCT/US2007/086648, Nov. 20, 2009, 3 pages.

* cited by examiner

*Primary Examiner* — James Sells
*Assistant Examiner* — Vicki Wu
(74) *Attorney, Agent, or Firm* — Kenneth B. Wood

(57) ABSTRACT

An adhesive tape masking article that can be used to mask both a door hinge or a corner includes a thin flexible sheet of material having opposed first and second major surfaces, first and second side edges, first and second end edges, and arcuate corners extending between at least one of the first and second side edges and the first and second end edges, and adhesive on at least a portion of at least one of the first and second major surfaces, thereby defining an adhesive surface for adhering the sheet to a surface to be masked. The sheet includes a frangible connection that allows the sheet to be separated into two masking articles, each of which can be used to mask corners.

15 Claims, 3 Drawing Sheets

ADHESIVE MASKING ARTICLE FOR CORNERS AND DOOR HINGES

CROSS REFERENCE TO RELATED APPLICATION

This is a divisional of U.S. application Ser. No. 11/614,192, filed Dec. 21, 2006, now issued as U.S. Pat. No. 7,922,844, the disclosure of which is incorporated by reference in its entirety herein.

BACKGROUND

The present invention relates generally to paint masking and, more particularly, to a disposable sheet-like adhesive tape article for masking both corners and door hinges.

When painting or staining a surface, care must be taken so that the paint does not get on the surfaces adjacent the area to be painted. This can be accomplished by carefully painting the surface or by masking off the area around the area to be painted. To facilitate the masking process, masking tape articles having specific sizes and shapes tailored to specific masking applications have been developed. Paint masking articles for masking door hinges, for example, are known in the prior art. U.S. Pat. No. 5,056,191 (Love) discloses a paint mask for a butt hinge and a masking method for protecting the hinge against paint spray or the like. U.S. Pat. No. 5,722,120 (Bindschatel et al.) discloses a pre-stamped half hinge adherent cover designed to protect the exposed surfaces of a half-hinge attached within the hinge recess of a door or jamb during the operation of coating.

Paint masking articles for masking corners are also known in the prior art. U.S. Pat. No. 6,579,587 (Schnoebelen, Jr.), for example, discloses a paint mask for masking corners. The paint mask if formed of a thin, flexible sheet having opposite faces. The paint mask includes a first leg and a second leg that are generally rectangular in shape, and the legs intersect to form a right angle adapted for masking a corner adjacent an area.

The need exists for an inexpensive masking article that is easy to make, easy to use, and which can be used to mask both door hinges and corners.

SUMMARY

The present invention provides an adhesive tape masking article that can be used to mask both conventional door hinges and corners. The masking article comprises a thin flexible sheet having opposed first and second major surfaces, first and second side edges, first and second end edges, and arcuate corners extending between at least one of the first and second side edges and the first and second end edges. The masking article further includes adhesive on at least a portion of at least one of the first and second major surfaces, thereby defining an adhesive surface for adhering the sheet to a surface to be masked. The sheet also includes a frangible connection that extends from one side edge of the sheet to the opposite side edge. The frangible connection allows the masking article to be separated into a pair of smaller masking articles, which can be used to mask a corner.

In one embodiment, the frangible connection extends perpendicularly from one side edge of the sheet to the opposite side edge. The frangible connection may be formed by cutting slits into the sheet, by punching holes in the sheet to form perforations, or by other known techniques. In addition, the frangible connection can be formed without creating a physical discontinuity in the sheet by providing a line of weakness in the sheet by, for example, scoring, notching, or creasing the sheet, thereby allowing a user to easily tear the sheet along the line of weakness.

In another embodiment, the arcuate corners have a radius of curvature configured to match the curved profile of a conventional door hinge. In a specific embodiment, the radius of curvature of the arcuate corner is greater than about 0.5 inches.

In another embodiment, at least one corner opposite the arcuate corners is a rounded corner having a radius of curvature configured to match the profile of a painted window frame. In another specific embodiment, the radius of curvature of the rounded corner is less than about 0.1 inches.

In yet another embodiment, the adhesive tape article is arranged on a backing or release liner. In other aspects, the adhesive tape article may be provided in the form of a roll, or in the form of a stack of sheets. In other aspects, adhesive surface may include a non-adhesive region, or the entire adhesive surface may be coated with adhesive.

In yet another aspect, the first end edge and the second end edge of the sheet include symmetric arcuate portions in the region proximate the second side edge. In another specific aspect, the backing sheet may be formed of a material selected from the group consisting of papers and films.

In yet another aspect, the invention provides a method of masking a door hinge or a corner, the method comprising the steps of providing a masking tape article having a size and shape generally corresponding to the size and shape of a door hinge, wherein the masking tape article includes a transverse frangible connection for separating the masking tape article into a pair of corner mask tape articles each having side edges that meet at an angle of 90 degrees. If a door hinge is being masked, the method comprises the step of placing the unseparated masking tape article over the door hinge, or, if a corner is being masked, the method comprises the step of separating the masking tape article along the frangible connection into a pair of corner mask articles each having side edges that meet at a generally 90 degree angle and placing one of the separated corner mask articles in the corner.

An advantage of certain embodiments of the masking article are that it can be used to mask both door hinges and corners, and that it can be used to mask sharp corners as well as rounded corners. In addition, the masking article can be manufactured in a manner that allows a continuous weed to be removed from the masking articles.

BRIEF DESCRIPTION OF THE DRAWINGS

The present invention will be further described with reference to the accompanying drawings, in which.

DETAILED DESCRIPTION

Figure 1A:
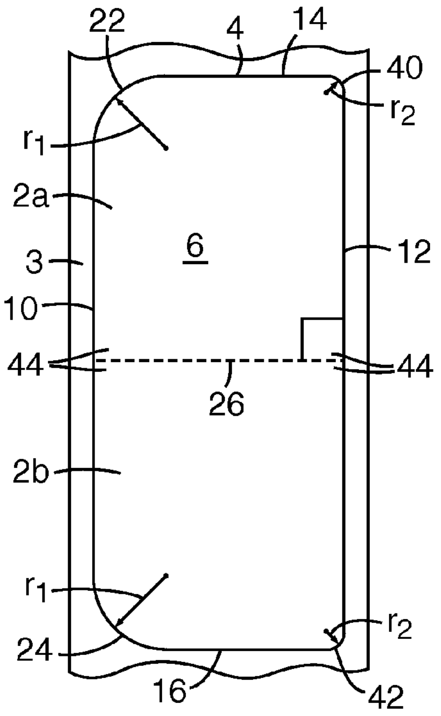
FIG. 1*a* is a front plan view of an adhesive tape article according to the invention.
Figure 1B:
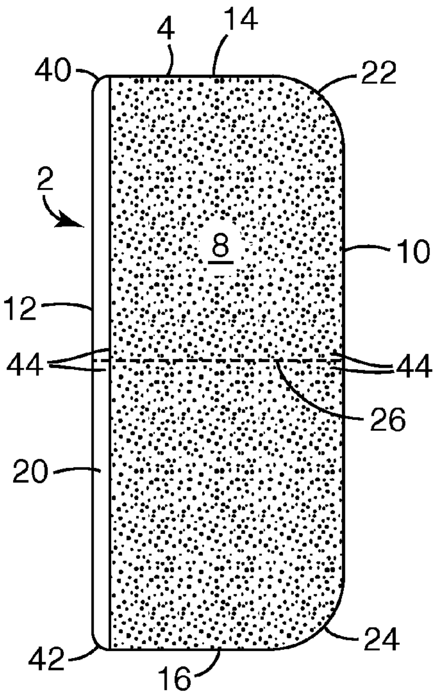
FIG. 1*b* is a rear plan view of the adhesive tape article of FIG. 1*a* removed from the release liner.

Referring now to the drawings, wherein like reference numerals refer to like or corresponding parts throughout the several views, FIGS. 1*a* and 1*b* show an adhesive tape masking article 2 that can be used to mask both conventional door hinges as well as corners, such as the corners of window frames. In FIG. 1*a*, the masking article 2 is arranged on a release liner 3, and in FIG. 1*b*, the masking article 2 has been removed from the release liner 3, and is turned over to reveal the bottom or adhesive surface of the masking article 2.

The tape masking article 2 comprises a relatively thin flexible sheet-like material 4 having opposed first 6 and second 8 major surfaces, opposed first 10 and second 12 side edges, and opposed first 14 and second 16 end edges. The first major surface 6, which may be thought of as the top surface of the article 2, is free of adhesive. The second major surface 8, which may be thought of as the bottom surface of the article 2, is provided with adhesive 18. The entire bottom surface 8 may be provided with adhesive, or the bottom surface 8 may include an adhesive region and a non-adhesive region 20.

The adhesive region 18 is typically a pressure sensitive adhesive (PSA), such as those typically used for masking tapes. Suitable PSA's include, for example, repositionable PSA's, natural or synthetic tackified rubber PSA's, or acrylic PSA's. Because the masking article 2 may be used on windows and the PSA may be exposed to sunlight, acrylic PSA's are preferred.

The optional non-adhesive region 20 may extend from the first end edge 14 to the second end edge 16 adjacent the second side edge 12. Arranged in this manner, the non-adhesive region 20 provides a non-adhesive tab that allows a user to readily grasp the article 2 and easily remove it from a release liner or from the surface to which it has been adhered. In addition, the non-adhesive region 20 minimizes the extent to which the user must touch the adhesive during the application of the masking article 2 to a surface during the masking process. When the article 2 is used to mask a door hinge, the article 2 may be configured so the non-adhesive region 20 overlays the hinge. In this manner, the door hinge may rotate freely after the masking article 2 has been applied to the door hinge.

The non-adhesive region 20 may be formed by any known method of producing a non-adhesive region, such as by applying a non-adhesive material onto the adhesive to render it non-tacky, or by otherwise treating or detackifying the adhesive so it is rendered non-tacky. Alternatively, the non-adhesive region 20 may be formed by simply not coating the non-adhesive region 20 with adhesive.

The sheet material 4 may be formed of any suitable flexible sheet material that is sufficiently durable to withstand the requirements of masking, can be coated with an adhesive, and is otherwise suitable as a masking tape backing. Suitable materials include, for example, paper, such as the paper used for conventional masking tapes. Such paper may be creped, and may be provided in various grades, thicknesses, and/or weights. Other papers, such as bond paper, for example, may also be used. In addition, the sheet material 4 may be formed of polymeric films or other flexible sheet-like materials.

In the illustrated embodiment, the first side edge 10 and the second side edge 12 are generally linear and generally parallel. In addition, the first end edge 14 and the second end edge 16 include symmetric arcuate portions 22, 24 in the region joining the first side edge 10 with the first and second end edges 14, 16. The illustrated shape is intended to closely match the shape of many commercially available door hinges. As such, the arcuate portions 22, 24 typically have a radius of curvature $r_1$ of greater than about ½ inch.

In the illustrated embodiment, the first 10 and second 12 side edges are asymmetric while the first 14 and second 16 end edges are symmetric. That is, if the masking article 2 is folded longitudinally such that the first and second side edges 10, 12 are brought together, the perimeter of the article 2 will not be aligned. Rather, the corner of the second side edge 12 will extend outwardly beyond the corresponding arcuate portions 22, 24. On the other hand, if the masking article is folded transversely such that the first and second end edges 14, 16 are brought together, the perimeter of the article 2 will be aligned.

The size and shape of the article 10 as illustrated generally corresponds to the size and shape of a widely commercially available door hinge. The size and shape of the article, however, can vary depending on the size and shape of the door hinge being masked.

In accordance with a characterizing aspect of the adhesive tape masking article 2, the sheet 4 includes a frangible connection 26 that extends transversely from the first side edge 10 to the second side edge 12. The frangible connection 26 may optionally extend longitudinally from the first end edge 14 to the second end edge 16. In the illustrated embodiment, the frangible connection 26 extends perpendicularly relative to each of the first and second side edges 10, 12, thereby transecting the sheet and forming a pair of separate masking articles 2*a*, 2*b* each having a pair of sharp 90 degree corners 44 along the edge defined by the frangible connection 26. By sharp, it is meant that the corner 44 is defined by edges that generally meet at a point, rather than being curved or blunted in the region where the edges meet.

Figure 2:
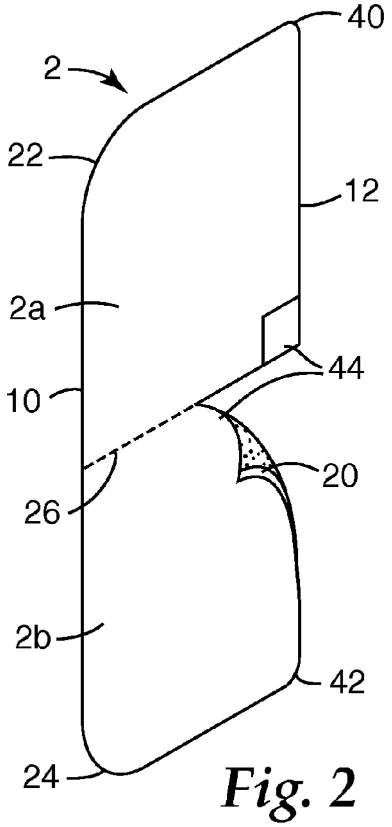
FIG. 2 is a perspective view of the adhesive tape article of FIG. 1*a* being separated into a pair of corner masking articles.

As shown in FIG. 2, the frangible connection 26 allows the article 2 to be readily separated along the frangible connection 26 into two separate masking articles 2*a*, 2*b*, each having sharp 90 degree corners 44 that allow each of the separate masking articles 2*a*, 2*b* to be used, for example, to mask corners. That is, the frangible connection 26 allows a user who desires to mask a corner to separate the article 2 into two masking articles 2*a* and 2*b* by manually separating the article 2 along the frangible connection 26 without the aid of a cutting tool. And because the frangible connection 26 is perpendicular to each of the side edges 10, 12, a pair of masking articles 2*a*, 2*b* each having a pair of sharp 90 degree corners is created. These masking articles 2*a*, 2*b* can, in turn, be used to mask sharp corners. Thus, the masking article 2 provides the user with the flexibility of masking door hinges or corners.

The frangible connection 26 can be formed by cutting slits into the sheet, thereby leaving a connecting portion between adjacent segments that can be easily broken, by punching holes in the sheet to form perforations, or by other known techniques. In addition, the frangible connection can be formed without creating a physical discontinuity in the sheet by providing a line of weakness in the sheet by, for example, scoring, notching, or creasing the sheet, thereby allowing a user to easily tear the sheet along the line of weakness.

In accordance with an optional characterizing aspect of the adhesive tape masking article 2, the article includes rounded corners 40, 42 in the corner regions joining the first and second end edges 14, 16 with the second side edge 12. These rounded corner regions 40, 42 are designed to match the size and shape of many older window frame corners that have been painted and therefore do not have sharp corners. That is, it has been found that many windows, such as older windows that have been painted previously, do not have sharp 90 degree corners. Rather, the corner region is slightly rounded. If a corner mask article having a sharp 90 degree corner is used to mask such a rounded corner, a portion of the surface meant to be painted will be inadvertently masked, and will therefore not be painted. The present masking article allows the user to choose the masking corner type (i.e. either a sharp 90 degree corner or a rounded corner) that more closely matches the actual configuration of the corner to be masked.

The rounded corners 40 and 42 can be used to mask rounded corners either when the separate masking articles 2*a*, 2*b* are still attached via the frangible connection, or after the separate masking articles 2*a*, 2*b* have been separated. The rounded corner regions 40, 42 typically have a radius of curvature $r_2$ of less than about 0.1 inches. Thus, when the article 2 is provided with rounded corners, the article 2 is provided with increased versatility and allows a user to mask door hinges, sharp corners, or rounded corners using one type of masking article. This reduces the number of different masking articles that the user must keep on hand to complete a particular job.

Figure 3:
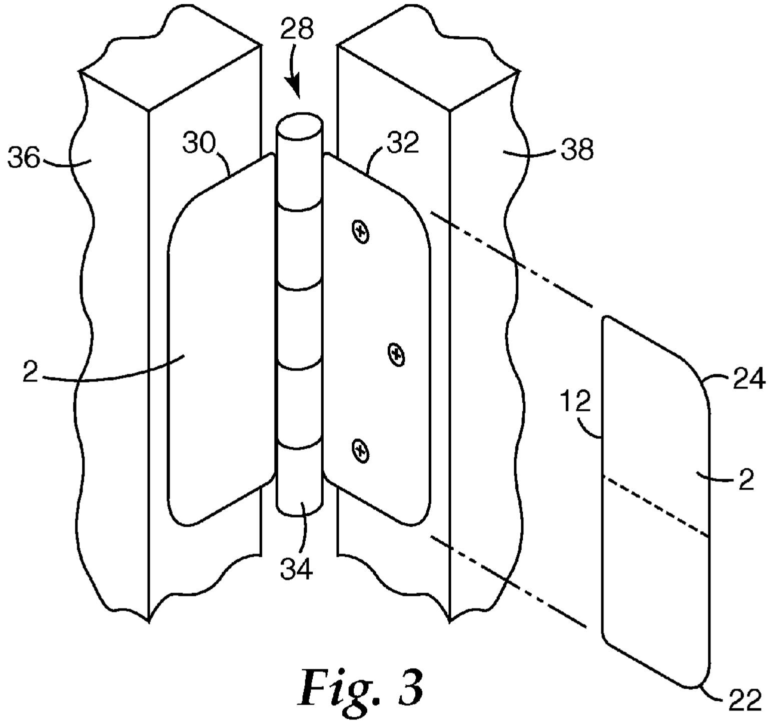
FIG. 3 is a perspective view showing the adhesive tape article being applied to a door hinge.

FIG. 3 illustrates a conventional door hinge 28, which includes a pair of leafs 30, 32 pivotally connected by a central barrel hinge mechanism 34, being masked using a pair of the tape masking articles 2 shown in FIG. 1. The door hinge 28 is arranged between a door jamb 36 and a door 38. The hinge 28 is masked by aligning a first tape masking article 2 so the profile of the masking article 2 matches the profile of a first one of the hinge leafs 30. That is, the masking article 2 is arranged so the curved portions 22, 24 of the article 2 are aligned with the corresponding curved portions of the hinge leaf 30, and the second side edge 12 is arranged adjacent the hinge mechanism 34. The masking article 2 is then adhered to the hinge leaf 30. In this manner, each masking article 2 covers one leaf. The second hinge leaf 32 is then masked with a second article in a similar manner.

Figure 4A:
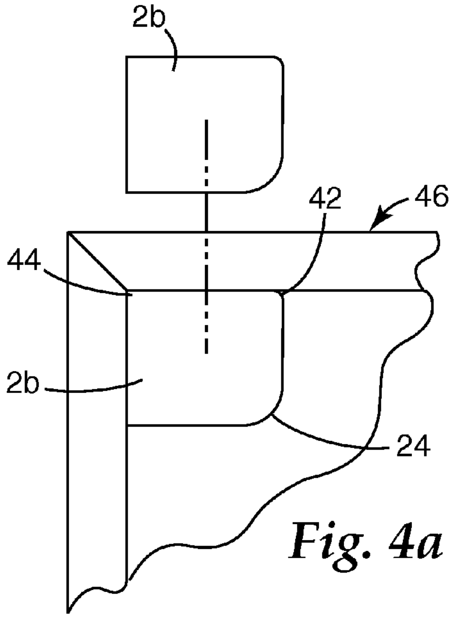
FIGS. 4*a* and 4*b* are plan views showing the adhesive tape article being applied to a window corner.
Figure 4B:
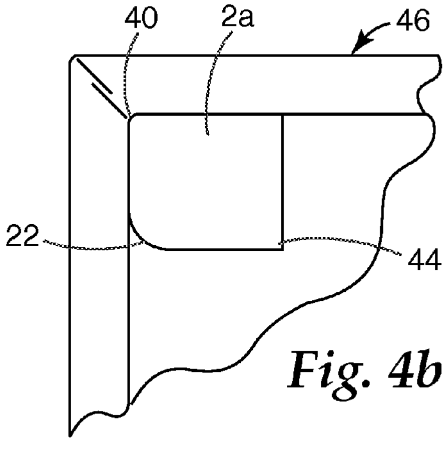

FIGS. 4*a* and 4*b* illustrate a corner of a window 46 being masked using the separated masking articles 2*a*, 2*b*. The corner of the window 46 is masked by aligning the desired corner of the masking article 2*a*, 2*b* with the corner of the window 46 and adhering the masking article 2*a*, 2*b* to the window. In FIG. 4*a*, a sharp corner 44 of the masking article 2*b* is arranged in the corner of the window 46, and in FIG. 4*b*, a rounded corner 40 of the masking article 2*a* is arranged in the corner of the window 46.

Used in the prescribed manner, the masking article 2 effectively masks the door hinge and corner and prevents the masked portion of the door hinge and window pane from inadvertently being painted as paint is otherwise applied to the door or window frame. The adhesive tape article 2 may be provided in the form of a roll or as a stack of sheets. The adhesive tape article 2 is typically provided on a release liner.

Figure 5:
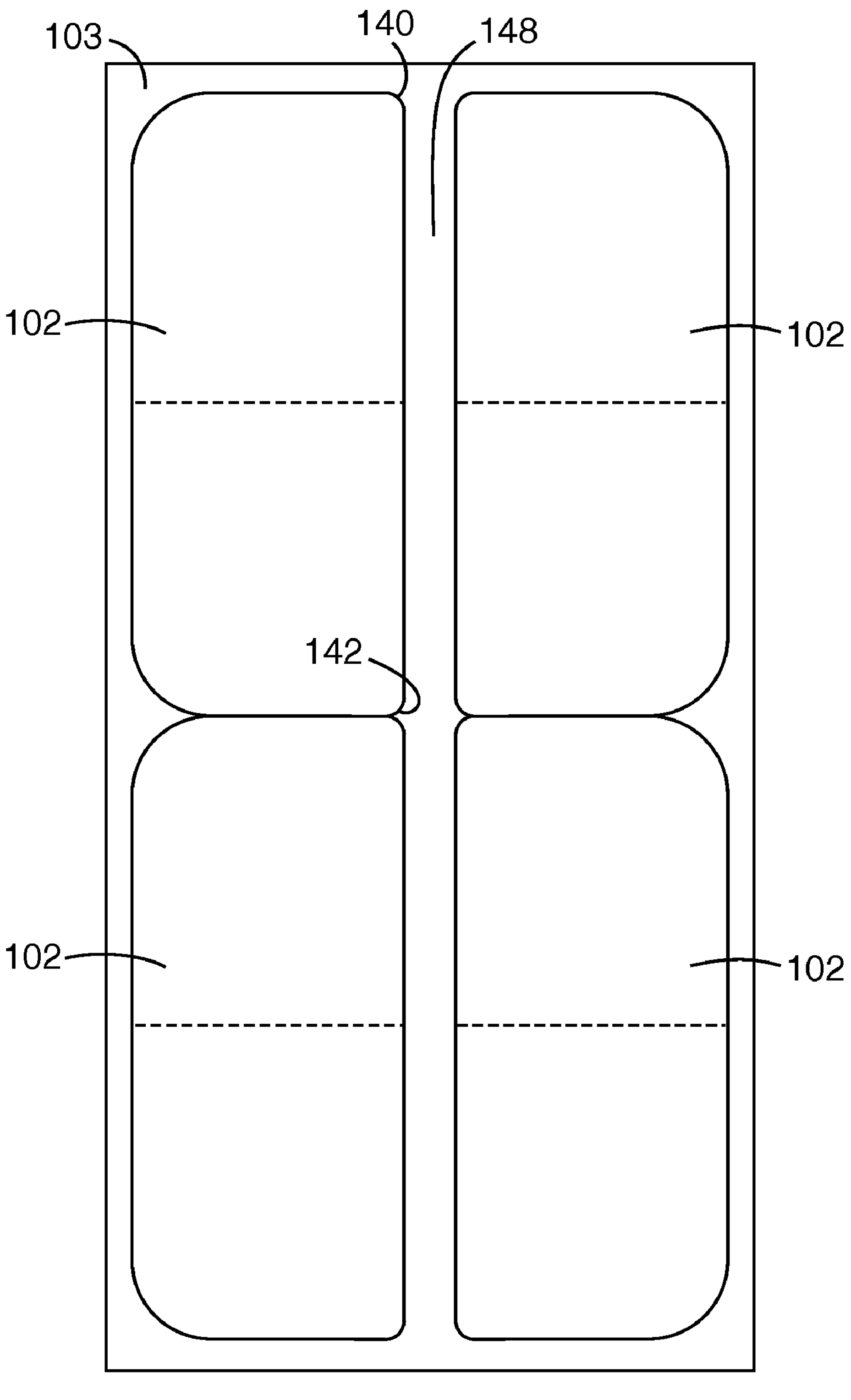
FIG. 5 is a front plan view of an alternative embodiment in which a plurality of adhesive tape articles are arranged on a release liner.

Referring now to FIG. 5, in which functionally similar features are referred to with like reference numerals incremented by 100, there is shown an alternate embodiment of the invention in which spaced aligned rows of adhesive tape masking articles 102 are arranged on a release liner 103. Each tape masking article 102 is the same as the tape masking article described above with respect to FIG. 1. The illustrated arrangement is desirable from a manufacturing standpoint because is allows a continuous weed to be removed from the space 148 between the rows of masking articles 102. That is, if the rows of masking articles 102 where not spaced, the small regions of material removed to form the rounded corners 140, 142 would be discrete pieces of material that would be difficult to collect, and would have a tendency to get lodged in undesirable places during manufacturing which could interfere with the operation of the equipment. By removing a continuous weed from between the rows of masking articles in the region that forms the space 148 between the rows, the waste/weed material can be collected in a controlled manner.

Persons of ordinary skill in the art may appreciate that various changes and modifications may be made to the invention described above without deviating from the inventive concept. Thus, the scope of the present invention should not be limited to the structures described in this application, but only by the structures described by the language of the claims and the equivalents of those structures.

What is claimed is:

1. A method of masking a surface, the method comprising the steps of:

(a) providing a masking tape article having a size and shape generally corresponding to the size and shape of a single leaf of a door hinge, wherein the masking tape article includes a transverse frangible connection for separating the masking tape article into a pair of corner-masking tape articles each having side edges that meet at an angle of 90 degrees, wherein the masking tape article comprises opposed first and second major surfaces, first and second opposite side edges, first and second opposite end edges, and, wherein the first and second opposite side edges each extend between arcuate corners of the article and are linearly uninterrupted between the arcuate corners, and wherein the frangible connection extends perpendicularly from one side edge of the masking tape article to the opposite side edge of the masking tape article and is oriented perpendicularly to each of the side edges of the masking tape article;

and, (b) if masking a leaf of a door hinge, placing the unseparated masking tape article onto the leaf of a door hinge; if masking a corner of a surface, separating the masking tape article along the frangible connection into a pair of corner-masking tape articles each having side edges that meet at a generally 90 degree angle and placing one of the separated corner mask articles onto the corner area of a surface.

2. The method of claim 1 wherein each of the arcuate corners extends between a first or second side edge of the masking tape article and a first or second end edge of the masking tape article.

3. The method of claim 2 wherein the masking tape article comprises at least two identical arcuate corners and wherein the masking tape article is symmetrical with an axis of symmetry that is defined by the frangible connection.

4. The method of claim 2 wherein the arcuate corners each have a radius of curvature configured to match a curved profile of a leaf of a door hinge.

5. The method of claim 4, wherein the radius of curvature of each arcuate corner is greater than about 0.5 inches.

6. The method of claim 4, wherein the surface is a window surface and wherein the masking tape article comprises, in addition to the arcuate corners, at least one corner that is a rounded corner having a radius of curvature configured to match the profile of a window frame that at least partially bounds the corner area of the window surface.

7. The method of claim 6, wherein the masking tape article comprises two identical arcuate corners and two identical rounded corners and wherein the masking tape article is symmetrical with an axis of symmetry that is defined by the frangible connection.

8. The method of claim 6, wherein the radius of curvature of the rounded corner is less than about 0.1 inches.

9. The method of claim 1 wherein the masking tape article comprises adhesive on at least a portion of at least one of the first and second major surfaces of the masking tape article.

10. The method of claim 9, wherein the adhesive is a repositionable adhesive.

11. The method of claim 9, wherein the masking tape article is arranged on a backing liner.

12. The method of claim 11, wherein the backing liner is formed of a material selected from the group consisting of paper and film.

13. The method of claim 11, wherein the adhesive tape article is provided in the form of a roll.

14. The method of claim 11, wherein the adhesive tape article is provided as a stack of sheets.

15. The method of claim 11, wherein the frangible connection is formed by perforating the liner.

* * * * *